US009521362B2

(12) United States Patent
Atzpadin et al.

(10) Patent No.: US 9,521,362 B2
(45) Date of Patent: Dec. 13, 2016

(54) VIEW RENDERING FOR THE PROVISION OF VIRTUAL EYE CONTACT USING SPECIAL GEOMETRIC CONSTRAINTS IN COMBINATION WITH EYE-TRACKING

(71) Applicant: Fraunhofer-Gesellschaft zur Foerderung der angewandten Forschung e.V., Munich (DE)

(72) Inventors: Nicole Atzpadin, Neuendorf (DE); Ingo Feldmann, Berlin (DE); Peter Kauff, Berlin (DE); Oliver Schreer, Berlin (DE); Wolfgang Waizenegger, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 14/287,264

(22) Filed: May 27, 2014

(65) Prior Publication Data
US 2014/0267584 A1 Sep. 18, 2014

Related U.S. Application Data

(63) Continuation of application No. PCT/EP2012/073985, filed on Nov. 29, 2012.
(Continued)

(51) Int. Cl.
*H04N 7/14* (2006.01)
(52) U.S. Cl.
CPC .................... *H04N 7/144* (2013.01)
(58) Field of Classification Search
CPC .... H04N 7/144; H04N 7/15; H04N 21/44008; H04N 21/4788; H04N 21/8146; H04N 7/157; G06T 2207/30201
(Continued)

(56) References Cited

U.S. PATENT DOCUMENTS 6,677,980 B1 *   1/2004   Jeon ........................... 348/14.16
8,581,838 B2 * 11/2013   Fahn ............................ 345/156
(Continued)

FOREIGN PATENT DOCUMENTS

EP    2 355 499 A1    8/2011
WO    2010/119852 A1   10/2010

OTHER PUBLICATIONS

Official Communication issued in International Patent Application No. PCT/EP2012/073985, mailed on Feb. 15, 2013.

*Primary Examiner* — Stella Woo
(74) *Attorney, Agent, or Firm* — Keating & Bennett, LLP (57) ABSTRACT

A virtual camera pose determiner is configured to determine a position and an orientation of a virtual camera. The position of the virtual camera is determined on the basis of a display position of a displayed representation of a remote participant on a display. The orientation of the virtual camera is determined on the basis of a geometrical relation between the display position of the remote participant on the display, and a position of a local participant. The virtual camera is configured to transmit an image or a sequence of images to the remote participant, so that an image provided by the virtual camera has the view on the local participant as is if viewed from the display position. Further embodiments provide a video communication system having a virtual camera pose determiner for providing a virtual camera pose on basis of the display position and the position of the local participant.

31 Claims, 7 Drawing Sheets

Related U.S. Application Data (60) Provisional application No. 61/564,915, filed on Nov. 30, 2011.

(58) Field of Classification Search
USPC ...... 348/14.16, 14.08, 14.09, 14.01; 382/154
See application file for complete search history.

(56) References Cited

U.S. PATENT DOCUMENTS

| | | | |
|---|---|---|---|
| 2008/0158340 A1* | 7/2008 | Shibata et al. | 348/14.16 |
| 2008/0297589 A1* | 12/2008 | Kurtz et al. | 348/14.16 |
| 2010/0103244 A1* | 4/2010 | Brandsma | H04N 7/144 |
| | | | 348/14.08 |
| 2011/0102538 A1* | 5/2011 | Tan | 348/14.08 |
| 2011/0267422 A1* | 11/2011 | Garcia et al. | 348/14.16 |
| 2013/0070046 A1* | 3/2013 | Wolf et al. | 348/14.16 |

\* cited by examiner

VIEW RENDERING FOR THE PROVISION OF VIRTUAL EYE CONTACT USING SPECIAL GEOMETRIC CONSTRAINTS IN COMBINATION WITH EYE-TRACKING

CROSS-REFERENCE TO RELATED APPLICATIONS

This application is a continuation of copending International Application No. PCT/EP2012/073985, filed Nov. 29, 2012, which is incorporated herein by reference in its entirety, and additionally claims priority from U.S. Provisional Application No. 61/564,915, filed Nov. 30, 2011, which is also incorporated herein by reference in its entirety.

BACKGROUND OF THE INVENTION

Embodiments of the present invention relate to a new approach to support video communication with the provision of eye contact. Some embodiments relate to a virtual camera pose determiner. Some embodiments relate to a video communication system. Some embodiments relate to a method for determining a position and an orientation of a virtual camera. Some embodiments relate to a method for video communication.

A significant drawback of current video communication systems is the lack of eye contact. This is caused due to fact that the user is looking onto the screen to the remote participant (to the displayed image of the remote participant), while the person is captured by a camera mounted on top of the display. A well-known approach is to provide a novel view of the remote participants based on a virtual camera, which is placed at the position where the users are looking at on the display. However, such a virtual camera is always looking straight in a fixed direction, whether the local participant is in the field of view of the camera or not. This may result in a "static" or unnatural appearance of the local participant when being rendered at the remote site.

U.S. Pat. No. 7,532,230 B1 discloses a method of communicating gaze in an immersive virtual environment. The method begins by representing an immersive virtual environment on a monitor that is viewable by a viewing participant. The monitor displays a plurality of objects in the virtual environment. The physical gaze of the viewing participant is tracked to determine a physical direction of the physical gaze within a physical environment including the viewing participant. Thereafter, a viewed object is determined at which the viewing participant is gazing. Then, a virtual direction is determined between the viewing participant and the viewed object in the immersive virtual environment. A model of the viewing participant is rotated based on the physical and virtual directions to render a view of the viewing participant such that the viewing participant is facing the viewed object in the immersive virtual environment. However, in U.S. Pat. No. 7,532,230 B1, the creation of the correct virtual view is not based on the concept of a virtual camera. Moreover, the concept disclosed in U.S. Pat. No. 7,532,230 B1 requires a full 3D model of the scene. No geometrical constraints are described in U.S. Pat. No. 7,532,230 that are required for eye contact and are based on the line of sight of the local participant and the eye positions of the remote participant shown on the display. U.S. Pat. No. 7,532,230 B1 does not mention that the position, where the user is looking at, may be a mid-eye, a left eye position or a right eye position.

SUMMARY

An embodiment may have a virtual camera pose determiner, configured to determine a position and an orientation of a virtual camera, wherein the position of the virtual camera is determined on the basis of a display position of a displayed representation of a remote participant on a display, wherein the orientation of the virtual camera is determined on the basis of a geometrical relation between the display position of the remote participant on the display, and a position of a local participant, and wherein the virtual camera is configured to transmit an image or a sequence of images to the remote participant, so that an image provided by the virtual camera has the view on the local participant as is if viewed from the display position.

According to another embodiment, a video communication system may have: an interface for receiving an inbound image or a sequence of inbound images; an inbound image analyzer for analyzing the (sequence of) inbound image(s) and configured to estimate a location of a sought image feature within the (sequence of) inbound image(s); display position determiner for determining a display position of the sought image feature when the (sequence of) inbound image(s) is displayed on a display for a local participant of a video communication; a local participant image interface for receiving a local participant image or a sequence of local participant images depicting at least a part of the local participant; a local participant position determiner for determining a position of the local participant on the basis of the local participant image or the sequence of local participant images; a virtual camera pose determiner for providing a virtual camera pose on basis of the display position and the position of the local participant; and a virtual view renderer for rendering a virtual view showing at least the local participant on the basis of the (sequence of) local participant image(s) and the virtual camera pose, so that the virtual view shows the local participant from a perspective according to the virtual camera pose.

According to another embodiment, a method for determining a position and an orientation of a virtual camera may have the steps of: receiving a displayed representation of a remote participant as displayed by means of a display; capturing a view of a local participant located in an environment of the display; determining a display position of the displayed representation of the remote participant; determining a position of a local participant on the basis of the view of the local participant; determining the position the virtual camera on the basis of the display position; determining the orientation of the virtual camera on the basis of the display position and the position of the local participant; and rendering a virtual view of the local participant as if viewed by the virtual camera.

Another embodiment may have a computer readable digital storage medium having stored there on a computer program having a program code for performing, when running on a computer, a method for determining a position and an orientation of a virtual camera as described above.

According to another embodiment, a method for video communication may have the steps of: receiving an inbound image or a sequence of inbound images; analyzing the (sequence of) inbound image(s); estimating a location of a sought image feature within the (sequence of) inbound image(s); determining a display position of the sought image feature when the (sequence of) inbound image(s) is displayed on a display for a local participant of a video communication; receiving a local participant image or a sequence of local participant images depicting at least a part of the local participant; determining a position of the local participant on the basis of the local participant image or the sequence of local participant images; providing a virtual camera pose on basis of the display position and the position of the local participant; and rendering a virtual view showing at least the local participant on the basis of the (sequence of) local participant image(s) and the virtual camera pose, so that the virtual view shows the local participant from a perspective according to the virtual camera pose.

Another embodiment may have a computer readable digital storage medium having stored there on a computer program having a program code for performing, when running on a computer, a method for video communication as described above.

BRIEF DESCRIPTION OF THE DRAWINGS

Embodiments of the present invention will be detailed subsequently referring to the appended drawings, in which.

DETAILED DESCRIPTION OF THE INVENTION

In order to overcome the problem of the lack of eye contact, some video communication systems generate a novel view of the remote participants based on a virtual camera, which is placed at the position where the users are looking at on the display.

The provision of virtual eye-contact typically necessitates exact rendering of virtual views in critical face regions, like eyes and nose that are very sensitive due to psycho-visual reasons. Apart from precise depth information in these regions, rendering has to respect special geometrical constraints referring to the line of sight. According to an aspect of the present invention, these constraints are addressed by special rendering methods in combination with an eye tracker. In other words, a new approach to support video communication with the provision of eye contact is described. The new approach of one or more aspects of the present invention is based on 3D analysis of the local and remote participant, estimating the viewing direction of the local participant to the remote participant displayed on the screen and rendering of a novel view of the remote participant based on the estimated 3D information.

Figure 1:
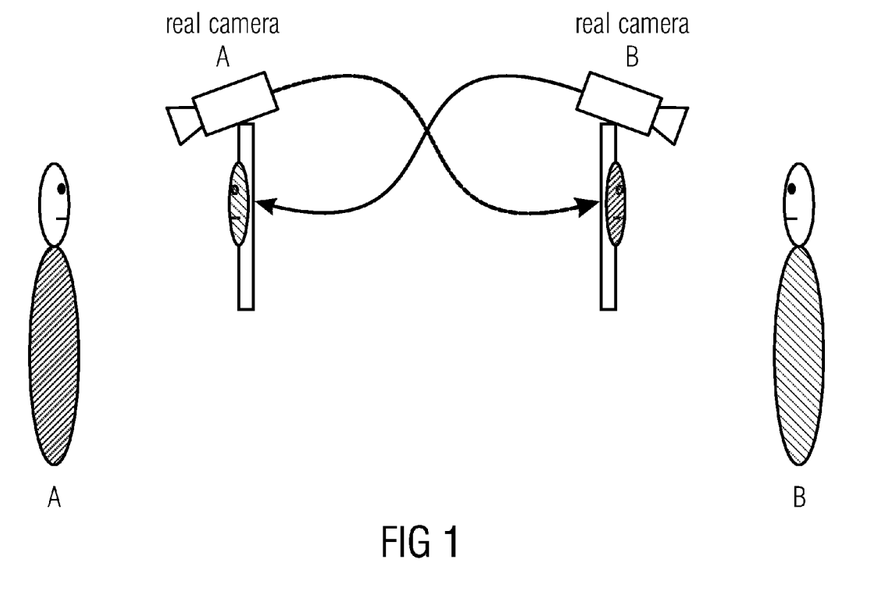
FIG. 1 schematically illustrates a general scenario of a video communication system with real cameras mounted on top of the display.

The geometry in a video communication system is explained by means of FIG. 1. FIG. 1 schematically illustrates the real scenario of a video communication system with real cameras mounted on top of the display. In FIG. 1, the general set-up of a (conventional) video communication system is depicted. Participants A and B are both captured with real cameras A and B on top of the display. The resulting image is then transmitted to the other party and shown on the display. Both participants do not perceive eye contact as they are looking onto the display and not looking into the camera.

Figure 2A:
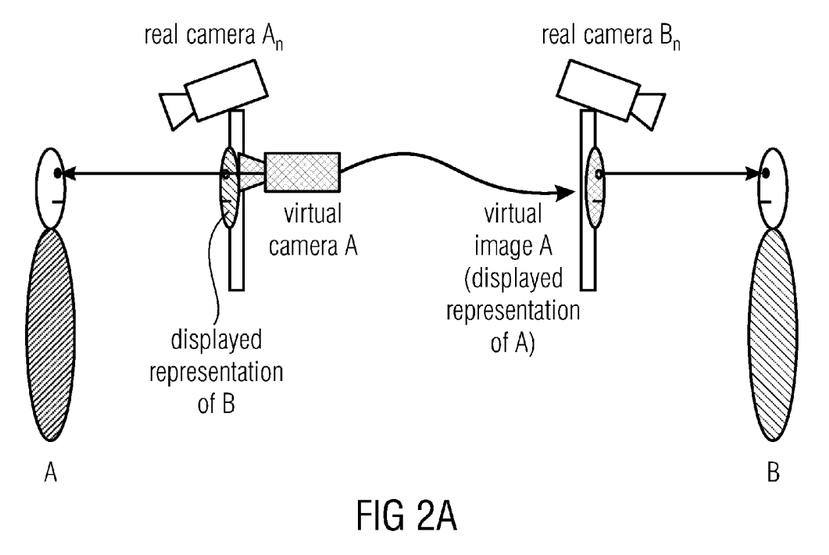
FIG. 2A schematically illustrates a video communication system after introduction of a virtual camera capturing participant A.

FIG. 2A schematically illustrates the introduction of a Virtual Camera. The eye contact problem can be solved, since a new camera, named as virtual camera A, is placed at a position on the display of participant A, where participant A is looking at and where the displayed image of participant B is located (see FIG. 2A). The view of this virtual camera A is then sent to participant B, which then perceives direct eye contact. The same holds for participant A (and any other participant using this system), assuming that the corresponding virtual camera at participant B's site is available. However, the viewing direction of each virtual camera is fixed (for example perpendicular to a display plane of the local display). Therefore, if the local participant is not directly in front of the virtual camera, but laterally or vertically offset and therefore viewing the local display at an angle, the remote participant has the impression of looking aside the local participant.

Figure 2B:
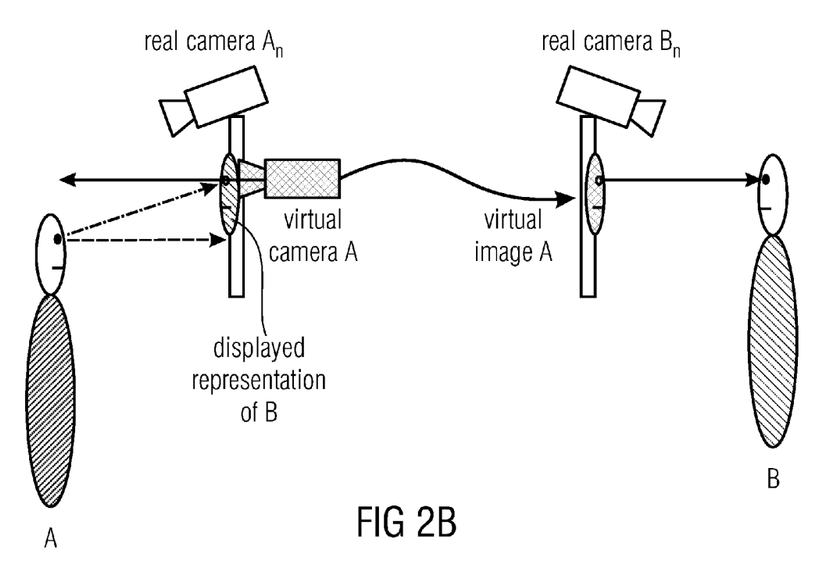
FIG. 2B schematically illustrates the video communication system of FIG. 2A when the local participant A and the virtual camera A are offset to each other.

FIG. 2B schematically illustrates the video communication system of FIG. 2A in a situation in which participant A is vertically offset relative to the virtual camera A. Participant A may look, for example, in a direction substantially perpendicular to the display (dashed arrow in FIG. 2B), when he/she is not looking at the displayed representation of participant B. Alternatively participant A may look at the displayed representation of participant B (dash-dot arrow in FIG. 2B). However, the view direction of the virtual camera A is perpendicular to the display so that the virtual camera A looks above participant A.

Figure 3:
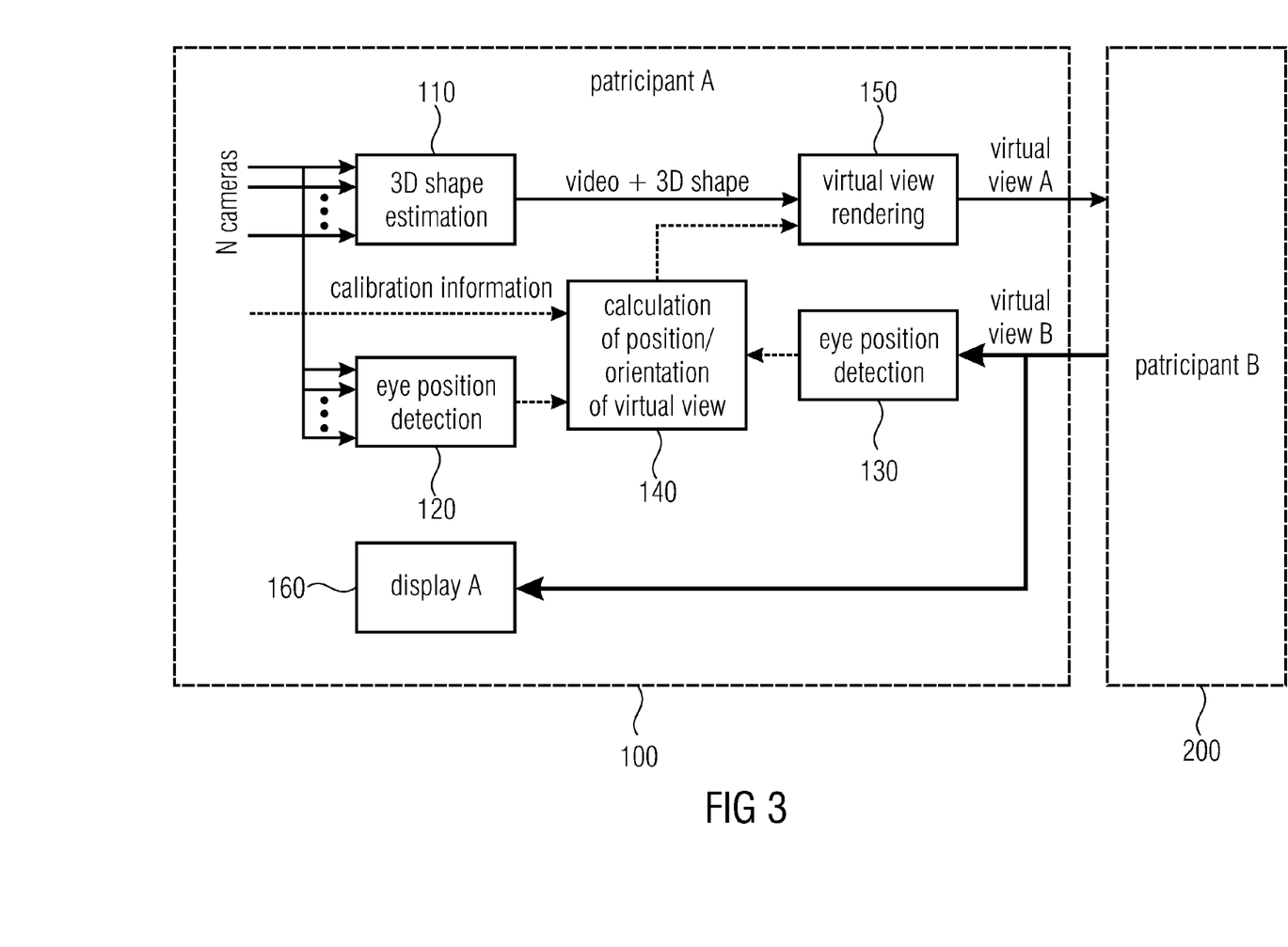
FIG. 3 schematically illustrates a workflow of a virtual eye contact engine according to embodiments.

FIG. 3 shows a schematic block diagram of the workflow of a virtual eye contact engine according to embodiments. As an example, the complete process can be described as follows. In order to provide virtual eye contact, the following tasks have to be performed.

(1) Estimating the 3D shape of each participant based on stereo- or multi-view video analysis. The 3D shape can also be estimated by using the input of a single camera and an appropriate 3D model. The information about the real camera position(s) is estimated in a calibration procedure beforehand or at run-time.

(2) Computing the position and orientation of the virtual camera at each site, which necessitates:
   a. position estimation of the participant's eyes in 3D space on the local site and
   b. estimation of the location, where the participant is looking at on the display based on the virtual view of the remote participant.

(3) Generation of a virtual view by applying image-based rendering of an original camera image and the related 3D shape information of the local participant and using the position and orientation information from step (2).

(4) The resulting virtual view, either as single video, multiple views, video +3D shape information, or a combination of these is transferred to the remote participant(s). In the case of multiple views or video+3D shape, the multiple views or the 3D shape may be identical or derived from a result of the multi-view analysis and/or the 3D shape estimation performed during task (1) so that a synergy between tasks (1) and (4) can be exploited.

The schematic block-diagram of the workflow is depicted in FIG. 3. The processing device 100 of the video communication system for participant A's site comprises a "3D shape estimation" block or component 110. The 3D shape estimation 110 receives the image or images from one or more local, real cameras at site A (number of cameras N≥1). The image(s) may be still images, video streams, individual frames, etc. and advantageously show participant A. The image(s) is/are also provided to an eye position detection 120 of the processing device. The eye position detection is configured to determine the 3D position of the eyes of participant A in front of a display 160 ("display A" in FIG. 3) of the processing device 100. The display 160 is not necessarily a part of the processing device 100, but may be connected to the processing device 100. The display 160 may be a monitor, a cathode ray tube (CRT), a flat screen, a projection screen (in connection with a video projector), etc. The 3D position of the eyes of participant A is determined by the eye position detection 120 relative to a local coordinate system at the site A.

The determined 3D position of the participant A's eyes is provided to a virtual pose determiner 140 configured to calculate the position/orientation of the virtual view, i.e. the pose of the virtual camera (virtual camera pose). The virtual pose determiner 140 further receives an information concerning the eye position of a local participant from a further eye position detection 130. The further eye position detection 130 receives a virtual view of remote participant B and analyzes this virtual view in order to determine the position of the participant B's eyes therein. This may be achieved by, for example, image processing and/or pattern matching.

The virtual camera pose determiner 140 further receives calibration information. The calibration information may contain, for example, the position and viewing direction of the real camera(s) at the local site A, and the position of the displayed representation of remote participant B on A's display (e.g., window coordinates of the window in which the displayed representation of participant B is shown).

The virtual camera pose determined by the virtual camera pose determiner 140 is provided to a virtual view rendering 150. The virtual view rendering 150 further receives video and 3D shape information from the 3D shape estimation 110. On the basis of the video information, the 3D shape information, and the virtual camera pose the virtual view rendering 150 generates a virtual view of participant A which is then sent to the remote participant B.

Typically, but not necessarily, a processing device 200 similar to processing device 100 is present at the remote site of participant B.

Figure 4:
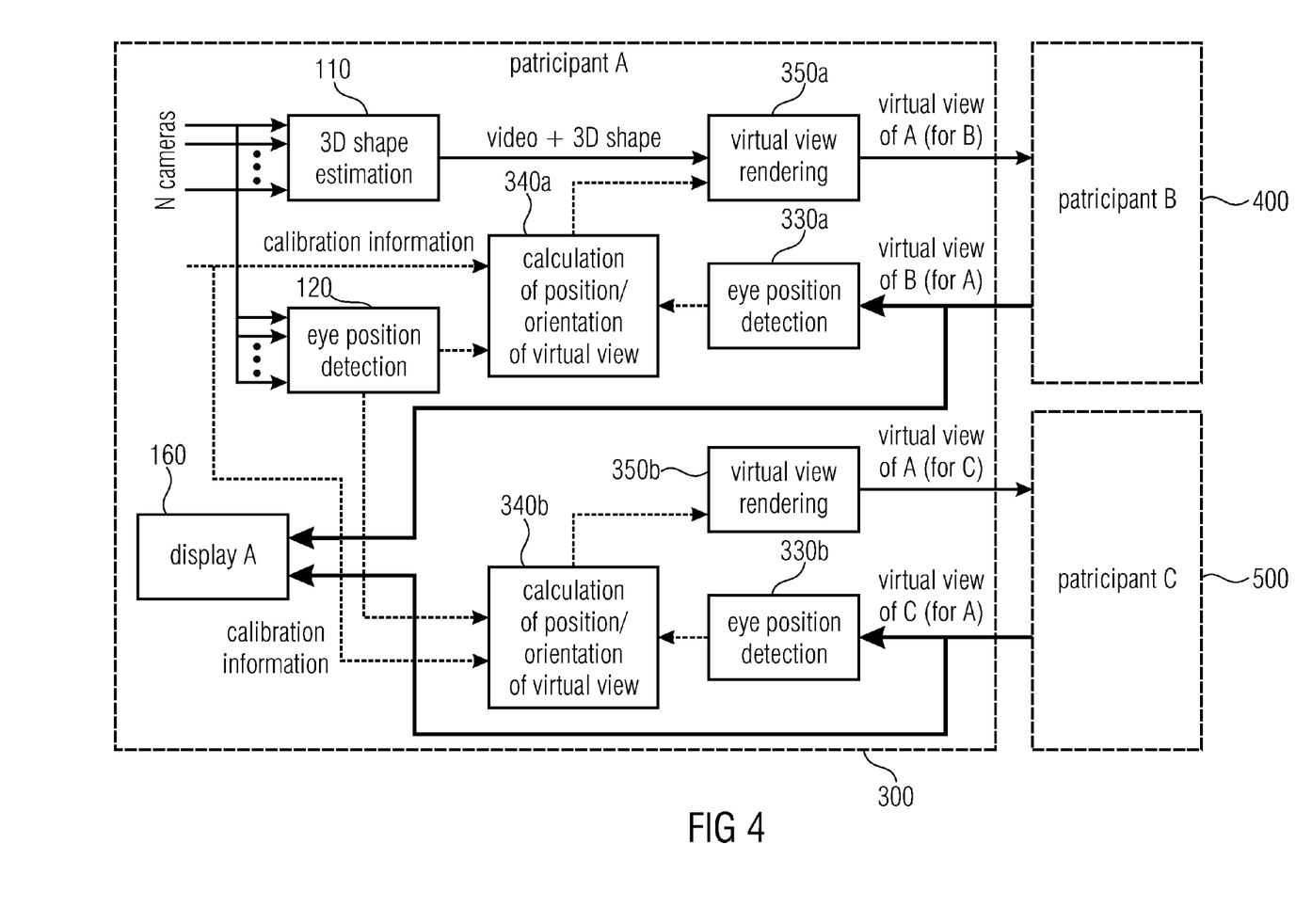
FIG. 4 schematically illustrates a workflow of a virtual eye contact engine supporting several remote participants according to embodiments.

FIG. 4 shows another embodiment of a virtual eye contact engine (or video communication system) 300 according to the teachings disclosed herein. Instead of only one remote participant B, the video communication system shown in FIG. 4 may interact with two remote participants B and C having similar processing devices (video communication systems) 400 and 500. To this end, the blocks "Calculation of position/orientation of virtual view" 340a and 340b, "eye position detection" (within the virtual views of B and C for the local participant A, respectively) 330a and 330b, and "virtual view rendering" 350a and 350b are doubled. In general, the video communication system could be used to communicate with even more than two remote participants. In this case the above mentioned units (330a and 330b, 340a and 340b, 350a and 350b) typically have to be provided in a number equal to the number of the remote participants.

The estimation of the 3D shape of each participant (block 110) may be implemented as follows. Based on correspondence analysis between two or more cameras the 3D shapes of the participants are calculated at each site. The 3D shape information can be calculated also based on a single camera and an appropriate underlying 3D model. This 3D shape information is not required as a full 3D model, but accurate enough from a frontal view. As the eye region is of significant importance, an eye tracker can be used to find and track the eye region. This information can then be transferred to the correspondence analysis to perform more detailed and more accurate processing in this specific region and to improve finally the accuracy of the resulting 3D shape information.

Regarding the computation of the position and orientation of the virtual camera, this computation may be divided in two parts. In the first part, the relation between the camera(s) and the display is estimated. On top of this some position on the display is computed based on the content shown on the display, on which the local participant is looking at. The second part is a simple 2D position relative to the position and orientation of the display in space.

An estimation of the relation between the camera(s) and the display is typically also performed, e.g. by a calibration. Relatively important for the computation of position and orientation of the Virtual Camera is the relation between camera(s) and the display. This can be achieved as follows:

A known target is used, which has a defined position and orientation to the display. If the target is seen by the camera(s), the position and orientation of the target can be estimated by standard pattern based calibration methods. Then, the Euclidean transformation between camera and target as well as target and display can be linked together and the Euclidean transformation between camera and display is known.

The users gaze direction is exploited in an interactive calibration procedure. In a first step the user is looking in the cameras, secondly the user is looking fronto-parallel onto the center of the display. Thirdly, the two gaze directions are used to calculate the relative position between camera(s) and display.

Figure 5:
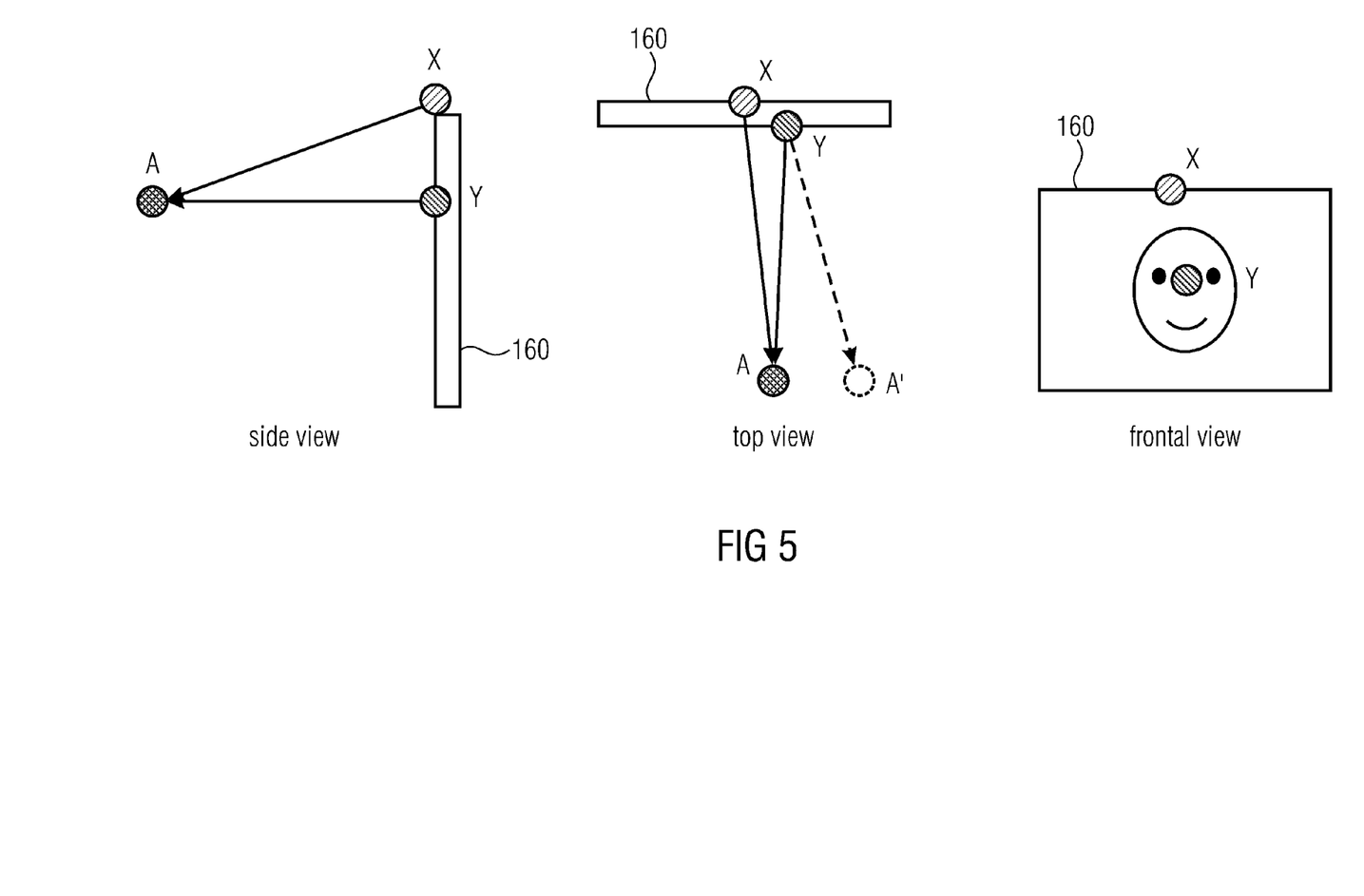
FIG. 5 schematically illustrates a position and an orientation of the virtual camera: side view (left), top view (middle), and frontal view (right)

With respect to FIG. 5, the position and orientation of the virtual camera is explained. In FIG. 5 the position of participant A is assigned with A. The position of the real camera A is assigned with X and that of the virtual camera B is assigned with Y. The orientation of the virtual camera B is represented by the arrow pointing from Y to A.

It is assumed that the virtual camera B is placed in the display plane and the geometrical relation between the real camera A and the display is known due to some calibration procedure.

Calculating the position of the virtual camera, i.e. the position where the participant A is looking at, may be performed as is explained now. The position of the virtual camera B is at the location, where the participant A is looking at. If participant A wants to perceive eye contact with the remote counterpart, then she/he will look in the eyes on the display. Such a position can be calculated by detection and tracking of the eyes in the image of the remote participant. Two approaches are proposed:

1. The first approach is to compute the mid-point between the two eyes of the remote participant shown on the display and locate the virtual camera at this point.
2. In practice, a person is not looking exactly between both eyes of someone else to perceive eye contact. Usually, either the left or the right eye is selected to look at. Hence, the correct position of the virtual camera is either in the left or right eye of the remote participant.

In both approaches, a position of the virtual camera is calculated.

Calculating the orientation of the virtual camera may be done as follows. The orientation is defined by the vector in space pointing from position on the display to the eye position of the participant A. In this case, the mid-eye position is the correct one, as the participant A is looking with both eyes into a single direction. As the participant A is captured by one or more cameras, the mid-eye position can be reconstructed since the eyes are recognized and tracked in the cameras.

In the middle picture of FIG. 5 a situation is illustrated in which the local participant A is not centered to the display, but rather offset to the right, as indicated by a dashed circle A'. A dashed arrow from Y to A' illustrates how the orientation of the virtual camera varies as the local participant A moves in front of the display.

To provide continuously eye contact, the mid-eye position of all the participants typically needs to be tracked all the time.

Figure 6:
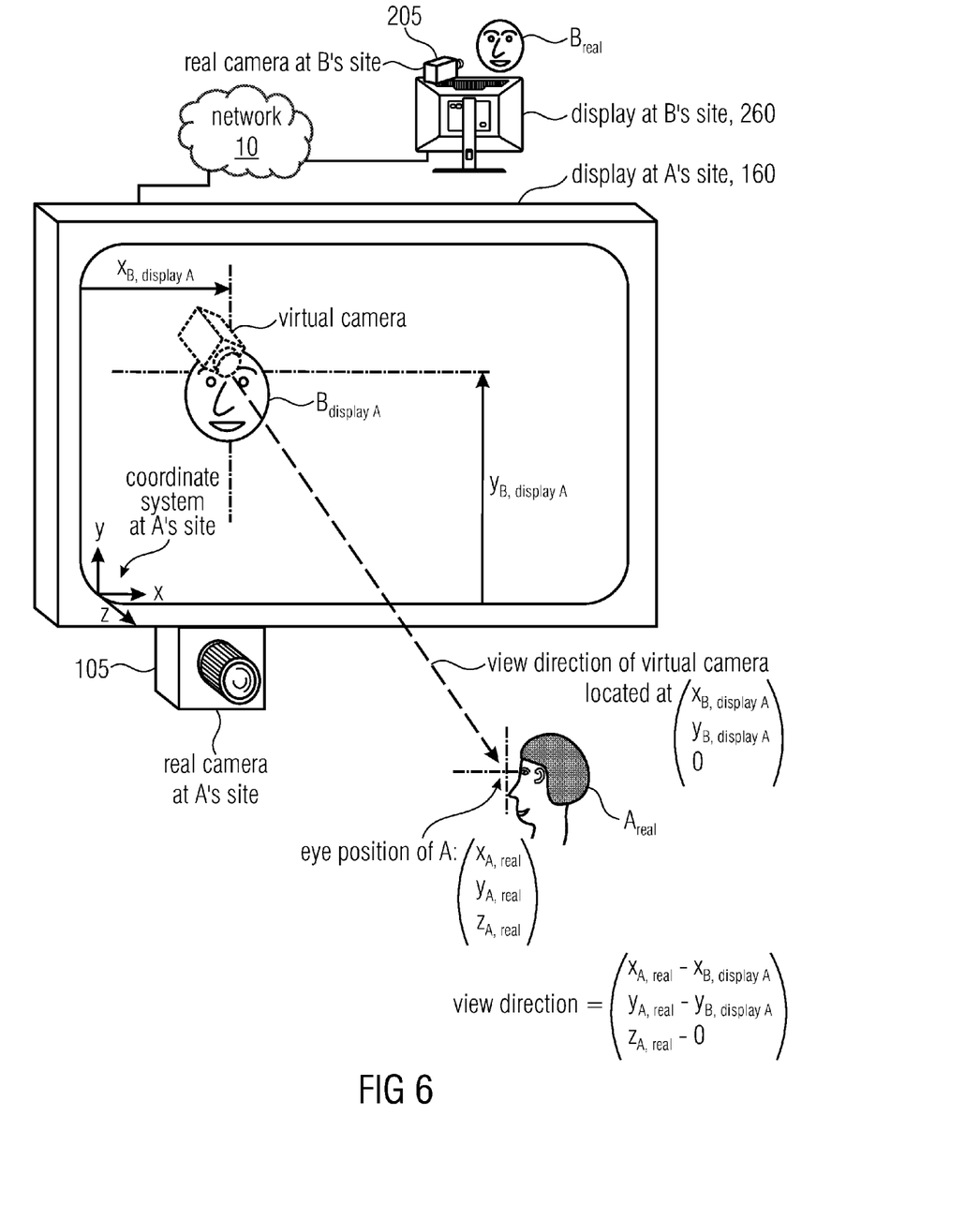
FIG. 6 schematically illustrates a geometry at a local video communication system ("A") and remote video communication system connected via a network, a cable, etc.

FIG. 6 shows a schematic illustration of the geometry at a local video communications system to illustrate the determination of the pose of the virtual camera. A local participant A ("$A_{real}$") sits or stands in front of a display ("display at A's site") 160. On the display 160, a displayed representation of a remote participant $B_{real}$ is shown. The displayed representation of the remote participant $B_{real}$ is labeled "$B_{display\_A}$". The displayed representation $B_{display\_A}$ is typically based on an inbound image which is sent from a remote video communication system at B's site, where the remote participant $B_{real}$ is captured using a remote real camera ("real camera at B's site") 205. The (sequence of) inbound image(s) may be obtained from an inbound video stream transmitted via a network 10. A remote display 260 is provided at the site of remote participant B ("display at B's site") so that remote participant B can view a representation of participant A.

At the local video communication system, the local participant $A_{real}$ is captured by one or more real cameras ("real camera at A's site") 105 which may be located somewhere around the display 160. In the illustrated example one real cameral 105 is located beneath the display 160; however, it could be above, to the left, to the right, or at one of the corners of the display 160. When several real cameras are used to capture the local participant $A_{real}$, each camera typically provides a different perspective on the local participant $A_{real}$. The one or more images provided by the real camera(s) 105 at the local site A are provided to a virtual view renderer (not shown in FIG. 6—see FIG. 3, "virtual view rendering" 150) and also to a device or a computer program for calculating a position/orientation of the virtual view (block labeled "Calculation of position/orientation of virtual view" 140 in FIG. 3). The position/orientation of the virtual view may be understood as the position/orientation of a virtual camera which is schematically illustrated in FIG. 6. The displayed representation $B_{display,A}$ of the remote participant acts as a local representative/substitute of the remote participant $B_{real}$ at the site of the local participant A. In particular, the local participant $A_{real}$ typically may watch the displayed representation $B_{display\_A}$ at his display 160 (display at A's site) when listening and/or talking to the remote participant $B_{real}$. Therefore, the position of the virtual camera is typically chosen to be at the position, where the displayed representation $B_{display,A}$ is located. In particular, the eye position of the displayed representation $B_{display,A}$ may be used as the virtual camera position.

A coordinate system may be defined at the local site which facilitates to express the various positions on the display and in front of the display 160 in a common manner. For example, the origin of the coordinate system may be located in the lower left corner of the display 160 at A's site. The x-coordinate and the y-coordinate extend in the display plane. The z-coordinate is, in the illustrated example, orthogonal to the display plane (other coordinate systems are also possible). Thus, the position of the displayed representation $B_{display\_A}$ may be expressed using the coordinate system at A's site as:

$$(x_{B,display}; y_{B,display}; 0)^T.$$

In order to determine the direction of the virtual camera, the position of the local participant $A_{real}$ may be determined, in particular the position of the eyes of $A_{real}$. Suppose, the position of A's eyes (e.g. mid-eye position) is given by $(x_{A,real}; y_{A,real}; z_{A,real})^T$. The orientation of the virtual camera shall aim at the local participant $A_{real}$, so that the virtual view provided to remote participant $B_{real}$ shows the local participant $A_{real}$, regardless of whether the local participant $A_{real}$ looks into the virtual camera (i.e., in the direction of the displayed representation $B_{displayA}$), or not. Therefore, the orientation of the virtual camera is given by a vector extending between the display position of the displayed representation $B_{display,A}$ and the position of $A_{real}$ in the 3D space in front of the display. Hence, the view direction of the virtual camera is parallel to $$(x_{A,real} - x_{B,display}; y_{A,real} - y_{B,display}; z_{A,real} - 0)^T.$$

Note that this calculation is an example and that various other options exist for determining the orientation of the virtual camera. The virtual view may be used to form at least a part of an outbound video stream.

Figure 7:
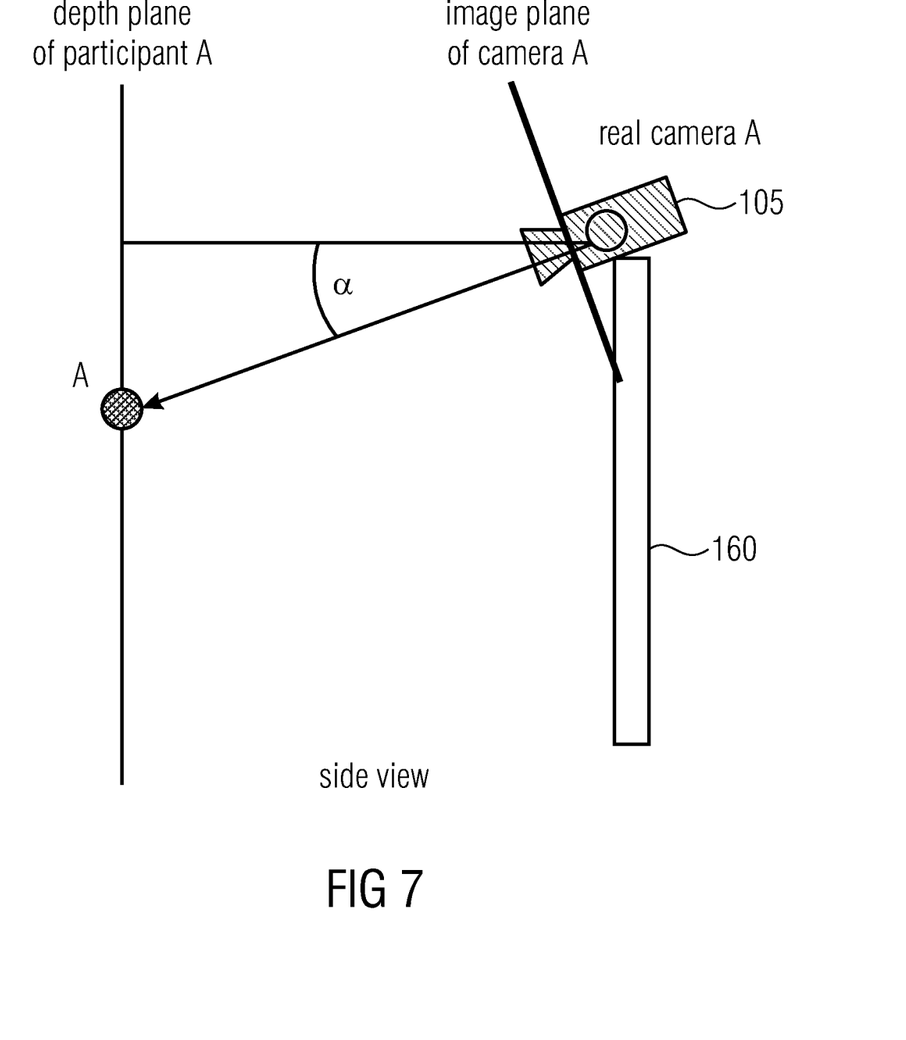
FIG. 7 schematically illustrates an orientation between a real camera and a fixed vertical depth plane.

It is also possible to perform an approximate solution without full reconstruction of the mid-eye position of participant A. In many scenarios such as office scenarios, the position of participant A is limited to a certain distance to the display. Due to this, the depth is known in the scene and just the horizontal and vertical position of the mid-eye position are calculated based on eye detection and tracking. However the orientation a of the image plane of the real camera A to the vertical plane, in which the participant A is located, needs to be known. This relationship is illustrated in FIG. 7. In particular, FIG. 7 illustrates the orientation between the real camera 105 and a fixed vertical depth plane.

Based on the video +3D shape information and the previously calculated target position and orientation of the virtual camera, the virtual view is generated and transferred to the remote site.

Aspects of at Least Some Embodiments:

Calculation of video +3D shape information based on at least two cameras or a single camera and an underlying 3D model     Detection and tracking of the mid-eye positions on the local site.

Detection and tracking of either the mid-eye, left or right eye positions in the virtual view     Calculation of the position of the virtual camera based on either
        the calculated mid-eye in the virtual view
        selection of either the left or right eye     Calculation of the orientation of a virtual camera based on the position, where the local participant is looking at on the display and the mid-eye positions of the local participant.

Estimation of the 3D eye position at each site of each local participant.

Estimation of the relation between the real camera(s) and the display

Rendering of a virtual view using the new virtual camera and the video + depth information from the remote participant The claims and the approach presented herein differ as follows from known video communication systems:

The creation of the correct virtual view is based on the concept of a virtual camera. Moreover this does not necessarily require a full 3D model of the scene.

The geometrical constraints necessitated for eye contact are based on the line of sight of the local participant and the eye positions of the remote participant shown on the display.

The position, where the user is looking at is specified more clearly as mid-eye, left or right eye position depending.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A virtual camera pose determiner, configured to determine a position and an orientation of a virtual camera, wherein the position of the virtual camera is determined on the basis of a display position of a displayed representation of a remote participant on a display, wherein the orientation of the virtual camera is determined on the basis of a geometrical relation between the display position of the remote participant on the display, and a position of a local participant;

wherein the virtual camera is configured to transmit an image or a sequence of images to the remote participant, so that an image provided by the virtual camera comprises the view on the local participant as is if viewed from the display position;

wherein the display position is determined as one of a mid-eye position, a left eye position and a right eye position of the displayed representation of the remote participant; and wherein the position of the local participant is determined as one of a mid-eye position, a left eye position, and a right eye position of the local participant.

2. The virtual camera pose determiner according to claim 1, wherein the orientation of the virtual camera is determined on the basis of a vector extending substantially from the display position to the position of the local participant.

3. The virtual camera pose determiner according to claim 1, wherein the position of the virtual camera substantially coincides with the display position.

4. The virtual camera pose determiner according to claim 1, wherein the display position is located in a display plane in which the displayed representation of the remote participant is located.

5. The virtual camera pose determiner according to claim 1, further comprising:
a display position determiner configured to determine the display position by identifying an image feature in the displayed representation of the remote participant.

6. The virtual camera pose determiner according to claim 5, wherein the image feature is assumed to be one of a face, a head, an eye or a pair of eyes, and wherein the display position determiner comprises at least one of a face detection and an eye detection configured to detect a face, an eye or a pair of eyes of the remote participant in the displayed representation of the remote participant.

7. The virtual camera pose determiner according to claim 1, further comprising a local participant position determiner configured to determine the position of the local participant using at least one of
a set of images showing the local participant from different perspectives for 3D reconstruction of an at least partial 3D shape of the local participant,
at least one image and a 3D model of the local participant, and
an eye tracker for tracking an eye or a pair of eyes of the local participant.

8. The virtual camera pose determiner according to claim 1, further comprising an input for the displayed representation of the remote participant, an internal or external interface for the position of the local participant, and an output for the determined pose of the virtual camera.

9. The virtual camera pose determiner according to claim 1, wherein the virtual camera pose determiner further comprises a gaze tracker configured to determine a gaze direction of the local participant.

10. The virtual camera pose determiner according to claim 1, further comprising a calibrator for calibrating a determination of the display position and a determination of the position of the local participant so that the display position and the position of the local participant can expressed using a common reference coordinate system.

11. A video communication system comprising:
an interface for receiving an inbound image or a sequence of inbound images;
an inbound image analyzer for analyzing the inbound image or the sequence of inbound images and configured to estimate a location of a sought image feature within the inbound image or the sequence of inbound images;
a display position determiner for determining a display position of the sought image feature when the inbound image or the sequence of inbound images is displayed on a display for a local participant of a video communication;
a local participant image interface for receiving a local participant image or a sequence of local participant images depicting at least a part of the local participant;
a local participant position determiner for determining a position of the local participant on the basis of the local participant image or the sequence of local participant images;
a virtual camera pose determiner for providing a virtual camera pose on basis of the display position and the position of the local participant;
a virtual view renderer for rendering a virtual view showing at least the local participant on the basis of the local participant image or the sequence of local participant images and the virtual camera pose, so that the virtual view shows the local participant from a perspective according to the virtual camera pose;
at least one further local participant image interface for receiving a further local participant image or a sequence of further local participant images showing the local participant from a different perspective than the local participant image or the sequence of local participant images; and
a 3D reconstruction component that analyzes the local participant image or the sequence of local participant images and the further local participant image or the sequence of further local participant images with respect to 3D information regarding the local participant.

12. The video communication system according to claim 11, wherein the sought image feature is one of an eye area, a face area, a mid-eye area, a left eye and a right eye of a remote participant of the video communication depicted in the inbound image or the sequence of inbound images.

13. The video communication system according to claim 11, further comprising a local image analyzer for analyzing the local participant image and for estimating a local image feature position of a sought image feature within the local participant image to be used by the local participant position determiner for determining the position of the local participant.

14. The video communication system according to claim 11, wherein the virtual camera pose determiner is configured to determine the orientation of the virtual camera on the basis of a vector extending substantially from the display position to the position of the local participant.

15. The video communication system according to claim 11, further comprising a calibrator for calibrating the virtual camera pose determiner with respect to at least one real camera connectable to the local participant image interface.

16. The video communication system according to claim 11, further comprising an eye tracker for tracking an eye or an eye area of the local participant, wherein a resulting eye position is used by the virtual camera pose determiner to determine the position of the local participant.

17. The video communication system according to claim 11, wherein the virtual view renderer is configured to use the 3D information for rendering the virtual view.

18. The video communication system according to claim 11, further comprising an outbound image interface,
wherein the inbound image or the sequence of inbound images interface and the outbound image interface are connectable, via a connection, to a remote outbound image interface and a remote inbound image interface of a remote video communication system.

19. The video communication system according to claim 11, connectable, via a plurality of connections, to a plurality of remote video communication systems,
wherein the video communication system comprises a number of entities of the interface, the inbound image analyzer, the display position determiner, the virtual camera pose determiner, and the virtual view renderer, respectively, corresponding to a number of the remote video systems.

20. The video communication system according to claim 11, further comprising a gaze tracker configured to determine a gaze direction of the local participant.

21. A method for determining a position and an orientation of a virtual camera, the method comprising:
receiving a displayed representation of a remote participant as displayed by a display;
capturing a view of a local participant located in an environment of the display;
determining a display position of the displayed representation of the remote participant;
determining a position of a local participant on the basis of the view of the local participant;
determining the position the virtual camera on the basis of the display position;
determining the orientation of the virtual camera on the basis of the display position and the position of the local participant;
rendering a virtual view of the local participant as if viewed by the virtual camera;
receiving a further local participant image or a sequence of further local participant images showing the local participant from a different perspective than the view of the local participant; and
analyzing the view of the local participant and the further local participant image or the sequence of further local participant images with respect to 3D information regarding the local participant.

22. The method according to claim 21, wherein the determination of the orientation of the virtual camera comprises determining a vector extending substantially from the display position to the position of the local participant.

23. The method according to claim 21, further comprising:
identifying an image feature in the displayed representation of the remote participant; and
determining the display position on the basis of an image feature position.

24. The method according to claim 21, wherein the determination of the display position comprises at least one of a face detection and an eye detection to detect a face, an eye or a pair of eyes of the remote participant in the displayed representation of the remote participant.

25. The method according to claim 21, wherein the determination of the position of the local participant comprises at least one of:
a 3D reconstruction using a set of images showing the local participant from different perspectives to determine an at least partial 3D shape of the local participant,
an evaluation of at least one image and a 3D model of the local participant, and
an eye tracking of an eye or a pair of eyes of the local participant.

26. A non-transitory computer readable digital storage medium having stored thereon a computer program comprising a program code for performing, when running on a computer, a method for determining a position and an orientation of a virtual camera, the method comprising:
receiving a displayed representation of a remote participant as displayed by a display;
capturing a view of a local participant located in an environment of the display;
determining a display position of the displayed representation of the remote participant;
determining a position of a local participant on the basis of the view of the local participant;
determining the position the virtual camera on the basis of the display position;
determining the orientation of the virtual camera on the basis of the display position and the position of the local participant;
rendering a virtual view of the local participant as if viewed by the virtual camera;
receiving a further local participant image or a sequence of further local participant images showing the local participant from a different perspective than the view of the local participant; and
analyzing the view of the local participant and the further local participant image or the sequence of further local participant images with respect to 3D information regarding the local participant.

27. A method for video communication comprising:
receiving an inbound image or a sequence of inbound images;
analyzing the inbound image or the sequence of inbound images;
estimating a location of a sought image feature within the inbound image or the sequence of inbound images;
determining a display position of the sought image feature when the inbound image or the sequence of inbound images is displayed on a display for a local participant of a video communication;
receiving a local participant image or a sequence of local participant images depicting at least a part of the local participant;
determining a position of the local participant on the basis of the local participant image or the sequence of local participant images;
providing a virtual camera pose on basis of the display position and the position of the local participant;
rendering a virtual view showing at least the local participant on the basis of the local participant image or the sequence of local participant images and the virtual camera pose, so that the virtual view shows the local participant from a perspective according to the virtual camera pose;
receiving a further local participant image or a sequence of further local participant images showing the local participant from a different perspective than the local participant image or the sequence of local participant images; and
performing a 3D reconstruction using the local participant image or the sequence of local participant images and the further local participant image or the sequence of further local participant images with respect to 3D information regarding the local participant.

28. The method according to claim 27, further comprising:
analyzing the local participant image; and
estimating a local image feature position of a sought image feature within the local participant image.

29. The method according to claim 27, wherein providing the virtual camera pose comprises:
determining a position of the virtual camera on the basis of the display position; and
determining an orientation of the virtual camera on the basis of the display position and the local image feature position.

30. The method according to claim 27, further comprising:

tracking an eye or an eye area of the local participant, wherein a resulting eye position is used as the position of the local participant by the determination of the virtual camera pose.

31. A non-transitory computer readable digital storage medium having stored thereon a computer program comprising a program code for performing, when running on a computer, a method for video communication, the method comprising:
- receiving an inbound image or a sequence of inbound images;
- analyzing the inbound image or the sequence of inbound images;
- estimating a location of a sought image feature within the inbound image or the sequence of inbound images;
- determining a display position of the sought image feature when the inbound image or the sequence of inbound images is displayed on a display for a local participant of a video communication;
- receiving a local participant image or a sequence of local participant images depicting at least a part of the local participant;
- determining a position of the local participant on the basis of the local participant image or the sequence of local participant images;
- providing a virtual camera pose on basis of the display position and the position of the local participant;
- rendering a virtual view showing at least the local participant on the basis of the local participant image or the sequence of local participant images and the virtual camera pose, so that the virtual view shows the local participant from a perspective according to the virtual camera pose;
- receiving a further local participant image or a sequence of further local participant images showing the local participant from a different perspective than the local participant image or the sequence of local participant images; and
- performing a 3D reconstruction using the local participant image or the sequence of local participant images and the further local participant image or the sequence of further local participant images with respect to 3D information regarding the local participant.

* * * * *

UNITED STATES PATENT AND TRADEMARK OFFICE
CERTIFICATE OF CORRECTION

PATENT NO. : 9,521,362 B2  
APPLICATION NO. : 14/287264  
DATED : December 13, 2016  
INVENTOR(S) : Nicole Atzpadin et al.

Page 1 of 1

It is certified that error appears in the above-identified patent and that said Letters Patent is hereby corrected as shown below:

On the Title Page

The first Inventor in item (72) should read as follows:
--Nicole Atzpadin, Hohen Neuendorf (DE)--

In the Claims

Claim 10, Column 11, Line 46 should read as follows:
--local participant can be expressed using--

Claim 11, Column 12, Line 2 should read as follows:
--camera pose on the basis of the display--

Claim 21, Column 13, Line 14 should read as follows:
--determining the position of the virtual camera--

Claim 26, Column 14, Line 1 should read as follows:
--determining the position of the virtual camera--

Claim 27, Column 14, Line 34 should read as follows:
--providing a virtual camera pose on the basis of the display--

Claim 31, Column 16, Line 4 should read as follows:
--providing a virtual camera pose on the basis of the display--

Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*